US009878875B1

(12) United States Patent
Scoville et al.

(10) Patent No.: US 9,878,875 B1
(45) Date of Patent: Jan. 30, 2018

(54) BUILDING SELECTION IN ELEVATOR SYSTEM SUPPORTING MOBILE DEVICE CALLS

(71) Applicant: Otis Elevator Company, Farmington, CT (US)

(72) Inventors: Bradley Armand Scoville, Farmington, CT (US); Kelly Martin Dubois, Unionville, CT (US); Walid Namane, Bridgeport, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/282,301

(22) Filed: Sep. 30, 2016

(51) Int. Cl.
*H04W 24/00* (2009.01)
*B66B 1/46* (2006.01)
*H04W 4/02* (2009.01)
*H04W 76/02* (2009.01)
*H04W 4/04* (2009.01)

(52) U.S. Cl.
CPC ............. *B66B 1/468* (2013.01); *H04W 4/023* (2013.01); *H04W 4/04* (2013.01); *H04W 76/025* (2013.01); *B66B 2201/4653* (2013.01)

(58) Field of Classification Search
CPC ... H04W 4/0123; H04W 4/04; H04W 76/025; H04W 4/043; B66B 1/468; B66B 1/34; B66B 2201/4615; B66B 2201/4653; B66B 1/00; H04M 3/00; G05B 13/00; G06Q 10/04; G06Q 10/00
USPC .......... 455/456.1, 41.2, 420, 456.3; 187/382, 187/141, 391; 340/521
See application file for complete search history.

(56) References Cited

U.S. PATENT DOCUMENTS

| 3,536,164 | A | * | 10/1970 | Chenhall ................... B66B 1/20 187/383 |
| 4,685,538 | A | * | 8/1987 | Kamaike ................. B66B 1/468 187/380 |
| 6,073,075 | A | | 6/2000 | Kondou et al. |
| 6,868,945 | B2 | | 3/2005 | Schuster et al. |
| 7,162,233 | B2 | * | 1/2007 | Chiba ....................... B66B 1/34 187/382 |
| 8,115,680 | B2 | | 2/2012 | Kalliola et al. |
| 8,230,981 | B2 | * | 7/2012 | Newville ................... B66B 1/34 187/391 |
| 8,350,758 | B1 | | 1/2013 | Parvizi et al. |
| 8,362,949 | B2 | | 1/2013 | Yang et al. |

(Continued)

FOREIGN PATENT DOCUMENTS

CN 106185495 A * 12/2016
EP 1329409 A2 7/2003
(Continued)

*Primary Examiner* — Mahendra Patel
(74) *Attorney, Agent, or Firm* — Cantor Colburn LLP

(57) ABSTRACT

A method for connecting a mobile device to an elevator system, the mobile device executing a mobile application for issuing elevator calls to the elevator system, includes: determining a geographical location of the mobile device; obtaining a list of buildings within a geographical range of the geographical location of the mobile device; determining if a registered building is in the list of buildings, the registered building being a building at which a user has registered with the elevator system; and automatically establishing a connection between the mobile device and the elevator system at the registered building.

17 Claims, 5 Drawing Sheets

(56) References Cited

U.S. PATENT DOCUMENTS

| | | |
|---|---|---|
| 8,401,472 B2 | 3/2013 | Gerstenkorn |
| 8,744,754 B2 | 6/2014 | Kappeler |
| 8,905,195 B2 | 12/2014 | Finschi |
| 8,909,258 B2 | 12/2014 | Tidd et al. |
| 8,944,219 B2 | 2/2015 | Gerstenkorn |
| 8,960,373 B2 | 2/2015 | De Vincentis |
| 9,046,373 B2 | 6/2015 | Bandyopadhyay et al. |
| 9,110,159 B2 | 8/2015 | Vartanian et al. |
| 9,323,232 B2 * | 4/2016 | Blom .................... G05B 13/00 |
| 2007/0041352 A1 | 2/2007 | Frankel |
| 2008/0067013 A1 * | 3/2008 | Ylinen ................... B66B 1/34 |
| | | 187/382 |
| 2013/0133986 A1 * | 5/2013 | De Vincentis ........ B66B 1/2408 |
| | | 187/380 |
| 2014/0041968 A1 * | 2/2014 | Tokura ................ B66B 1/2458 |
| | | 187/389 |
| 2014/0274110 A1 * | 9/2014 | Mehta ................... H04W 4/043 |
| | | 455/456.1 |
| 2015/0321881 A1 | 11/2015 | Salmikuukka et al. |
| 2015/0350845 A1 | 12/2015 | Patel et al. |
| 2016/0016756 A1 | 1/2016 | Elomaa |
| 2016/0031676 A1 | 2/2016 | Haipus |
| 2016/0122157 A1 | 5/2016 | Keser |
| 2016/0210569 A1 * | 7/2016 | Enck .................... G06Q 10/0637 |
| 2016/0272460 A1 * | 9/2016 | Simcik .................. B66B 1/468 |
| 2016/0355375 A1 * | 12/2016 | Simcik .................. B66B 1/468 |

FOREIGN PATENT DOCUMENTS

| | | | | |
|---|---|---|---|---|
| EP | 1858794 A1 * | 11/2007 | ............... | B66B 1/34 |
| JP | 2005280906 A | 10/2005 | | |
| WO | WO 0183351 A1 * | 11/2001 | ............... | B66B 1/468 |
| WO | 02066357 A1 | 8/2002 | | |
| WO | WO 03053835 A1 * | 7/2003 | ............... | B66B 1/14 |
| WO | 2009132696 A1 | 11/2009 | | |
| WO | 2014116182 A1 | 7/2014 | | |
| WO | 2015065315 A1 | 5/2015 | | |
| WO | WO 2015065315 A1 * | 5/2015 | ............. | B66B 1/468 |
| WO | 2015084396 A1 | 6/2015 | | |
| WO | WO 2015084396 A1 * | 6/2015 | ............. | B66B 1/468 |
| WO | 2015119620 A1 | 8/2015 | | |

* cited by examiner

BUILDING SELECTION IN ELEVATOR SYSTEM SUPPORTING MOBILE DEVICE CALLS

TECHNICAL FIELD

The subject matter disclosed herein generally relates to a mobile device interface to an elevator system, and more specifically, to a system that facilitates building selection in an elevator system that supports mobile device calls.

DESCRIPTION OF RELATED ART

In some elevator systems a user may place an elevator call using a mobile device such as a mobile phone. In order to interface with the elevator system, the user typically must register with the elevator system in the building. The user must identify the building or buildings by entering an address or other identifier for the building. Once the building is identified, registration may entail sending a request to an administrator for permission to register with the building. The administrator then verifies the user's credentials and sends an access code to the user. The user then uses the access code to register with the elevator system to enable the ability to interface with the elevator system using their mobile device. This process is cumbersome on the user and requires the user to know an address or other identifier of the building.

SUMMARY

According to one embodiment, a method for connecting a mobile device to an elevator system, the mobile device executing a mobile application for issuing elevator calls to the elevator system, includes: determining a geographical location of the mobile device; obtaining a list of buildings within a geographical range of the geographical location of the mobile device; determining if a registered building is in the list of buildings, the registered building being a building at which a user has registered with the elevator system; and automatically establishing a connection between the mobile device and the elevator system at the registered building.

In addition to one or more of the features described above, or as an alternative, further embodiments may include wherein the automatically establishing the connection between the mobile device and the elevator system at the registered building includes automatically establishing the connection between the mobile device and the elevator system at the registered building nearest to the geographical location of the mobile device.

In addition to one or more of the features described above, or as an alternative, further embodiments may include wherein the determining includes determining if the list of buildings includes a preferred building, the preferred building being a registered building that the user has designated as preferred; and wherein the automatically establishing the connection between the mobile device and the elevator system comprises establishing the connection between the mobile device and the elevator system at the preferred building.

In addition to one or more of the features described above, or as an alternative, further embodiments may include wherein the automatically establishing the connection between the mobile device and the elevator system comprises establishing the connection between the mobile device and the elevator system at the preferred building nearest to the geographical location of the mobile device.

In addition to one or more of the features described above, or as an alternative, further embodiments may include wherein the establishing the connection between the mobile device and the elevator system at the preferred building nearest to the geographical location of the mobile device occurs when the preferred building nearest to the geographical location of the mobile device is within a first threshold distance.

In addition to one or more of the features described above, or as an alternative, further embodiments may include wherein when the preferred building nearest to the geographical location of the mobile device is not within the first threshold distance, then establishing the connection between the mobile device and the elevator system at a registered building nearest to the geographical location of the mobile device when the registered building nearest to the geographical location of the mobile device is within a second threshold distance.

In addition to one or more of the features described above, or as an alternative, further embodiments may include receiving a selection to establish a connection with a second elevator system at a second building; terminating the connection between the mobile device and the elevator system at the registered building; and establishing a second connection between the mobile device and the second elevator system at the second building.

In addition to one or more of the features described above, or as an alternative, further embodiments may include wherein establishing the second connection between the mobile device and the second elevator system at the second building includes determining if the user is registered with the second building; when the user is registered with the second building, establishing the second connection between the mobile device and the second elevator system at the second building; when the user is not registered with the second building, completing a registration process with the second elevator system at the second building prior to establishing the second connection between the mobile device and the second elevator system at the second building.

In addition to one or more of the features described above, or as an alternative, further embodiments may include wherein completing the registration process with the second elevator system at the second building prior to establishing the second connection between the mobile device and the second elevator system at the second building includes designating the second building as a preferred building.

According to another embodiment, a mobile device includes: a memory storing a mobile application; a processor for executing the mobile application; and a communications module for communicating with an elevator system; wherein the processor executes the mobile application to implement operations comprising: determining a geographical location of the mobile device; obtaining a list of buildings within a geographical range of the geographical location of the mobile device; determining if a registered building is in the list of buildings, the registered building being a building at which a user has registered with the elevator system; and automatically establishing a connection between the mobile device and the elevator system at the registered building.

In addition to one or more of the features described above, or as an alternative, further embodiments may include wherein the automatically establishing the connection between the mobile device and the elevator system at the registered building includes automatically establishing the connection between the mobile device and the elevator system at the registered building nearest to the geographical location of the mobile device.

In addition to one or more of the features described above, or as an alternative, further embodiments may include wherein the determining includes determining if the list of buildings includes a preferred building, the preferred building being a registered building that the user has designated as preferred; and wherein the automatically establishing the connection between the mobile device and the elevator system comprises establishing the connection between the mobile device and the elevator system at the preferred building.

In addition to one or more of the features described above, or as an alternative, further embodiments may include wherein the automatically establishing the connection between the mobile device and the elevator system comprises establishing the connection between the mobile device and the elevator system at the preferred building nearest to the geographical location of the mobile device.

In addition to one or more of the features described above, or as an alternative, further embodiments may include wherein the establishing the connection between the mobile device and the elevator system at the preferred building nearest to the geographical location of the mobile device occurs when the preferred building nearest to the geographical location of the mobile device is within a first threshold distance.

In addition to one or more of the features described above, or as an alternative, further embodiments may include wherein when the preferred building nearest to the geographical location of the mobile device is not within the first threshold distance, then establishing the connection between the mobile device and the elevator system at a registered building nearest to the geographical location of the mobile device when the registered building nearest to the geographical location of the mobile device is within a second threshold distance.

In addition to one or more of the features described above, or as an alternative, further embodiments may include wherein the operations further comprise: receiving a selection to establish a connection with a second elevator system at a second building; terminating the connection between the mobile device and the elevator system at the registered building; and establishing a second connection between the mobile device and the second elevator system at the second building.

In addition to one or more of the features described above, or as an alternative, further embodiments may include wherein establishing the second connection between the mobile device and the second elevator system at the second building includes determining if the user is registered with the second building; when the user is registered with the second building, establishing the second connection between the mobile device and the second elevator system at the second building; when the user is not registered with the second building, completing a registration process with the second elevator system at the second building prior to establishing the second connection between the mobile device and the second elevator system at the second building.

In addition to one or more of the features described above, or as an alternative, further embodiments may include wherein completing the registration process with the second elevator system at the second building prior to establishing the second connection between the mobile device and the second elevator system at the second building includes designating the second building as a preferred building.

According to another embodiment, a computer program product for connecting a mobile device and an elevator system, the computer program product comprising a computer readable storage medium having program instructions embodied therewith, the program instructions executable by a processor to cause the processor to implement operations comprising: determining a geographical location of the mobile device; obtaining a list of buildings within a geographical range of the geographical location of the mobile device; determining if a registered building is in the list of buildings, the registered building being a building at which a user has registered with the elevator system; and automatically establishing a connection between the mobile device and the elevator system at the registered building.

Technical effects of embodiments include the ability to automatically establish a connection between a mobile device and an elevator system at a building, to facilitate user interaction with the elevator system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
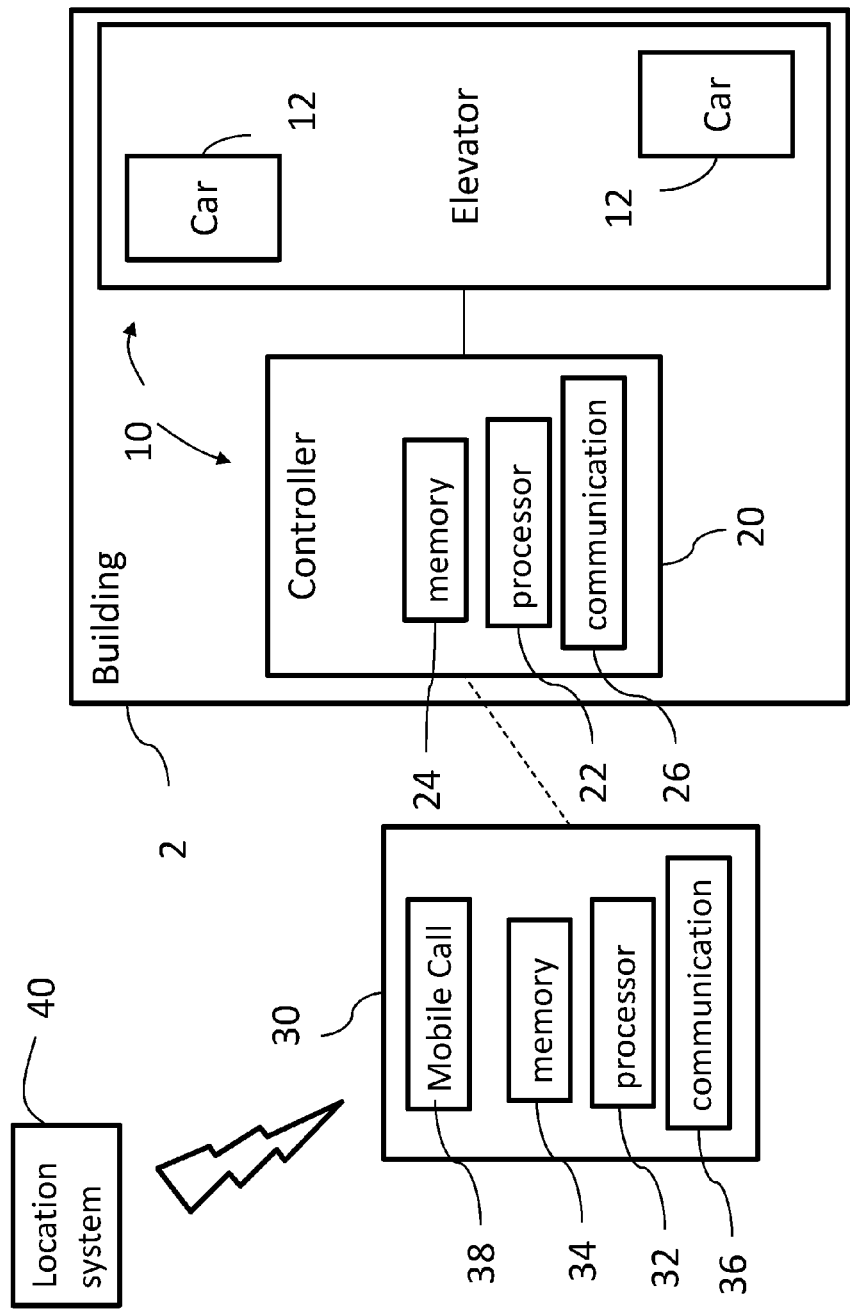
FIG. 1 depicts an environment for implementing embodiments of the invention.

FIG. 1 depicts an elevator system 10 in accordance with one or more embodiments. The elevator system 10 is installed at a building 2. In some embodiments, the building 2 may be an office building or a collection of office buildings that may or may not be physically located near each other. The building 2 may include a number of floors. Persons entering the building 2 may enter at a lobby floor, or any other floor, and may go to a destination floor via one or more conveyance devices, such as the elevator system 10 having elevator cars 12.

The elevator system 10 may include one or more computing devices, such as a controller 20. The controller 20 may be configured to control dispatching operations for one or more elevator cars 12 associated with the elevator system 10. The elevator cars 12 may be located in the same hoistway or in different hoistways so as to allow coordination amongst elevator cars in different elevator banks serving different floors. It is understood that other components of the elevator system 10 (e.g., drive, counterweight, safeties, etc.) are not depicted for ease of illustration.

Also shown in FIG. 1 is a mobile device 30. The mobile device 30 may comprise a device that is typically carried by a person, such as a phone, PDA, electronic wearable, RFID tag, laptop, tablet, watch, or any other known portable mobile device. The mobile device 30 may include a processor 32, a memory 34, and a communication module 36 as shown in FIG. 1. The processor 32 can be any type or combination of computer processors, such as a microprocessor, microcontroller, digital signal processor, application specific integrated circuit, programmable logic device, and/or field programmable gate array. The memory 34 is an example of a non-transitory computer readable storage medium tangibly embodied in the mobile device 30 including executable instructions stored therein, for instance, as firmware. The communication module 36 may implement one or more communication protocols as described in further detail herein.

The mobile device 30 executes a mobile call application 38, which may be implemented by software stored in memory 34 having instructions executed by processors 32. The installation, setup and use of the mobile call application 38 is described in further detail herein.

The controller 20 may include a processor 22, a memory 24, and communication module 26 as shown in FIG. 1. The processor 22 can be any type or combination of computer processors, such as a microprocessor, microcontroller, digital signal processor, application specific integrated circuit, programmable logic device, and/or field programmable gate array. The memory 24 is an example of a non-transitory computer readable storage medium tangibly embodied in the controller 20 including executable instructions stored therein, for instance, as firmware. The communication module 26 may implement one or more communication protocols as described in further detail herein.

The mobile device 30 and the controller 20 communicate with one another through any known communication means. According to one or more embodiments, the communication between the mobile device 30 and the controller 20 is done through systems such as transmitters, converters, receivers, and other transmitting and processing elements depending on the communication type selected. For example, the mobile device 30 and the controller 20 may communicate with one another when proximate to one another (e.g., within a threshold distance). The mobile device 30 and the controller 20 may communicate over a wireless network, such as 802.11x (WiFi), short-range radio (Bluetooth), or any other known type of wireless communication. In some embodiments, the controller 20 may include, or be associated with (e.g., communicatively coupled to) a networked element, such as kiosk, beacon, hall call fixture, lantern, bridge, router, network node, etc. The networked element may communicate with the mobile device 30 using one or more communication protocols or standards. For example, the networked element may communicate with the mobile device 30 using near field communications (NFC), or any type of known wired or wireless communication means. According to one or more other embodiments, the networked element may communicate with the mobile device 30 through a cellular network or over the internet through a number of other devices outside the building.

In other embodiments, the controller 20 may establish communication with a mobile device 30 that is outside of the building 2 through any known communication means. This connection may be established with various technologies including GPS, triangulation, or signal strength detection, by way of non-limiting example. The communication connection that can be established includes, but is not limited to, a cellular connection, a WiFi connection, a Bluetooth connection, a peer-to-peer connection, a satellite connection, a NFC connection, some other wireless connection, and even a wired connection using an Ethernet cable, coaxial cable, or other data cable. These communication connections may transport data between the mobile device 30 using a number of different networks ranging from a private secure direct communication link to transporting the data over the internet through multiple different servers, switches, etc.

In one embodiment, a location system 40 stores location data related to one or more buildings 2. The location system 40 may be implemented using a processor-based device (e.g., a computer server or cloud computing platform). The location system 40 may store the geographical location of one or more buildings 2. The mobile device 30 may be configured to wirelessly communicate with the location system 40 (e.g., via a cellular connection). In one embodiment, the location system may be integrated with the controller 20. In an embodiment, the mobile device 30 may be configured to determine a geographical location of the mobile device 30. For example, the mobile device 30 may be configured to determine a longitude and latitude of the mobile device 30. In one embodiment, the geographical location of the mobile device 30 may be determined by a global positioning system. In one embodiment, the geographical location of the mobile device 30 may be determined by wireless communications (e.g., WiFi or cellular triangulation). In another embodiment, the geographical location of the mobile device 30 may be determined in response to a signal from the controller 20 received at the mobile device 30. The mobile device 30 can determine the geographical location of the mobile device 30 based on the signal strength of the signal from the controller 20.

Once the user is authorized to access the elevator system 10, the user can make elevator calls to the elevator system 10 though the mobile call application 38. The elevator calls may be hall calls (e.g., up or down) or destination calls (e.g., a specified floor). Embodiments relate to registering the user with the elevator system 10 to establish the building 2 as a registered building for that user and automatically connecting the mobile device 30 to the elevator system 10.

Figure 2:
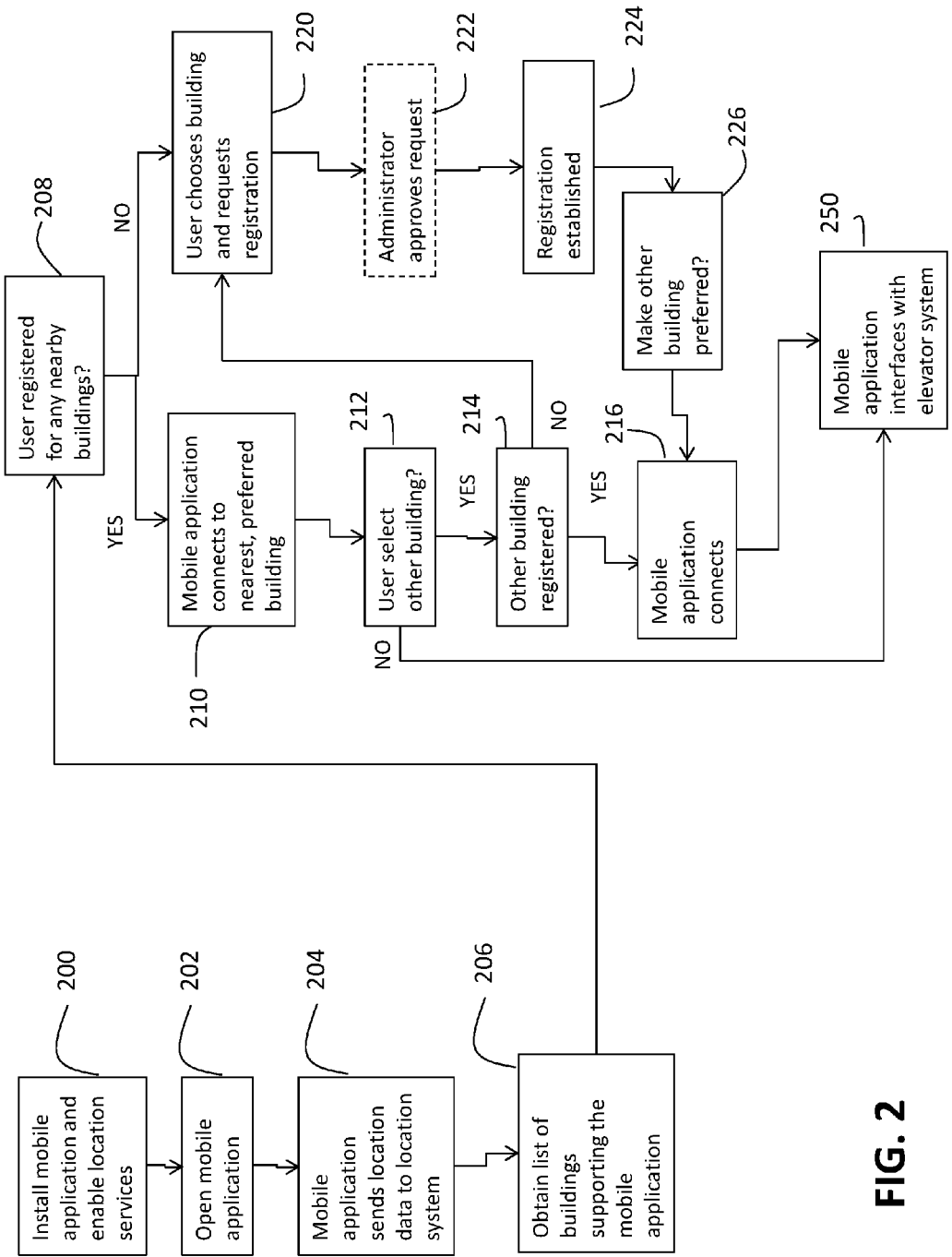
FIG. 2 depicts a flowchart of a process for connecting a mobile device to an elevator system in an embodiment.

FIG. 2 depicts a flowchart of a process for selecting a building 2, and corresponding elevator system 10, to access with the mobile device 30. The process begins at 200 where the user installs the mobile application 38 and enables location services on the mobile device 30. The mobile application 38 may be obtained from server 40, any other network connected device, or installed by a wired connection to a source (e.g., a personal computer). Enabling location services on the mobile device 30 may include accessing settings on the mobile device 30 to ensure that the location of the mobile device 30 is being determined and made available to at least the mobile application 38.

At 202, the mobile application 38 is launched on the mobile device 30 and at 204 the geographical location of the mobile device 30 is provided to the location system 40. The geographical location of the mobile device 30 may be determined by the mobile device 30 using GPS, network triangulation, etc. At 206, the location system 40 uses the geographical location of the mobile device 30 to determine buildings that support the mobile application 38, within a geographical range of the geographical location of the mobile device 30. The range may be predetermined by the mobile application 38 or may be a user-defined geographical range. In one example, the geographical range may be 200 meters, but it is understood that other ranges may be used. A list of buildings within the geographical range of the geographical location of the mobile device 30 is obtained from the location system 40 by the mobile device 30.

In other embodiments, the geographical location of one or more buildings 2 may be stored on the mobile device 30. The building geographical location data may be stored when the mobile application 38 is installed, and updated periodically as new buildings are added to the system. In these embodiments, the mobile device 30 would not need to send the geographical location of the mobile device 30 to the location system 40 at 204. The list of buildings within the geographical range of the geographical location of the mobile device 30 is determined from the building geographical location data stored on the mobile device, rather than requiring communication with location system 40. In these embodiments, the list of buildings within the geographical range of the geographical location of the mobile device 30 is obtained from the mobile device 30.

Figure 3:
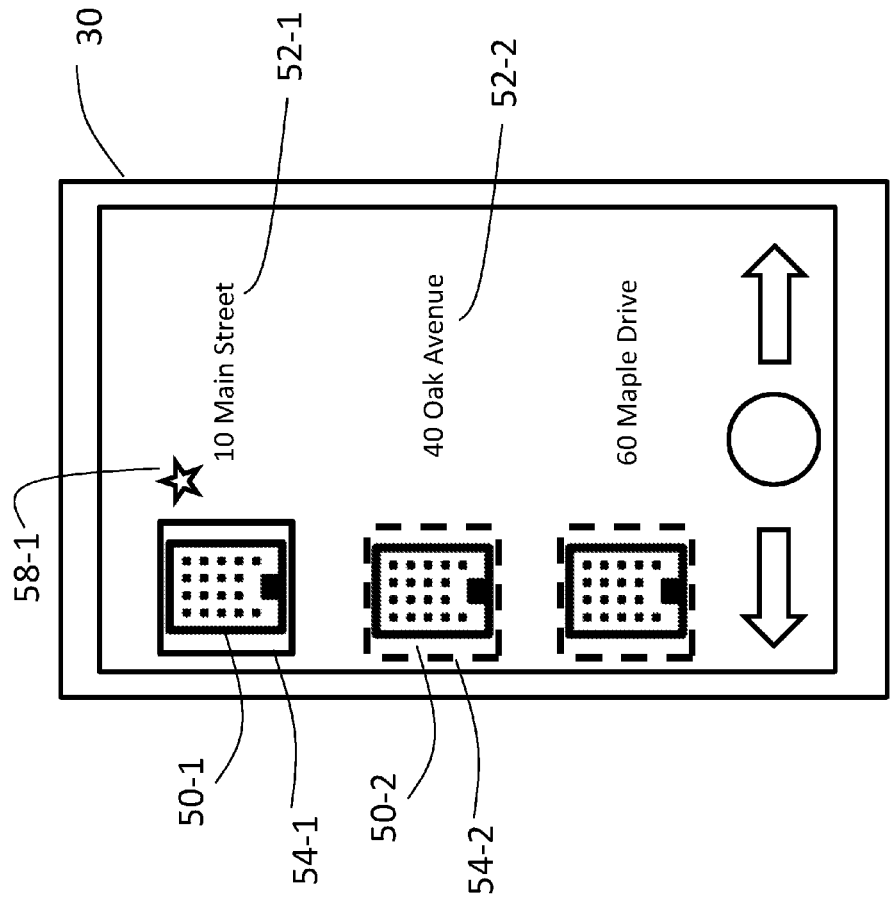
FIG. 3 depicts a user interface on a mobile device in an embodiment.

FIG. 3 depicts an exemplary user interface on the mobile device 30. The user interface depicts building indicia 50-1 and 50-2, which may include a building identifier 52-1 and 52-2 (e.g., building address or building name) and a registration indicia 54-1 and 54-2 that indicates whether the user is already registered to use the mobile application 38 with the elevator system 10 at the building 2. For example, in FIG. 3 a solid frame is used as the registration indicia 54-1 to note that the user is already registered to use the mobile application 38 with the elevator system 10 at building 50-1. A dashed frame is used as the registration indicia 54-2 to note that the user has not registered to use the mobile application 38 with the elevator system 10 at building 50-2. A preferred indicia 58-1, such as a star, highlighting, particular color or shape, or other identifier, is used to identity a building as a preferred building. The user can identify one or more buildings as preferred through the user interface 30. The user may designate his/her primary work building as preferred, a favorite hotel as preferred, etc. It is understood that the user interface of FIG. 3 is just one example, and the building indicia, building identifier, registration indicia and/or preferred indicia may take a variety of forms.

Referring back to FIG. 2, at 208 the mobile application 38 determines if the user is already registered with the elevator system(s) 10 at any of the buildings 2 within the geographical range of the geographical location of the mobile device 30. When a user has completed the registration process with an elevator system 10 at a building 2, that building is considered a registered building. An affirmative indication at 208 leads to 210, where the mobile device 30 automatically connects to the controller 20 of the nearest, preferred, registered building 2. The nearest building is the building having the shortest distance to the geographical location of the mobile device 30. A preferred building is any building that the user has designated as preferred through the user interface 30. If there are no preferred, registered buildings within the geographical range of the geographical location of the mobile device 30, the mobile device 30 connects to the elevator system 10 associated with the nearest, registered building at 210.

The processing at 210 may take into account the distance to the nearest, preferred building in determining whether to establish a connection with an elevator system 10. For example, if the distance to the nearest, preferred building is greater than a first threshold distance (e.g., greater than 100 meters), then the mobile device 30 may connect to the nearest, registered (but non-preferred) building. This processing may also require that the nearest, registered building be within a second threshold distance to the mobile device 30 (e.g., within 25 meters).

This connection between the mobile device 30 and the controller 20 of the elevator system 10 occurs without the user needing to access the mobile device 30. The mobile device 30 connects with the controller 20 by communicating with the controller 20 to send a request to connect, which may include information identifying the user (e.g., a username), passwords, etc. The user may now make elevator calls to the elevator system 10 using the mobile device 30.

Figure 4:
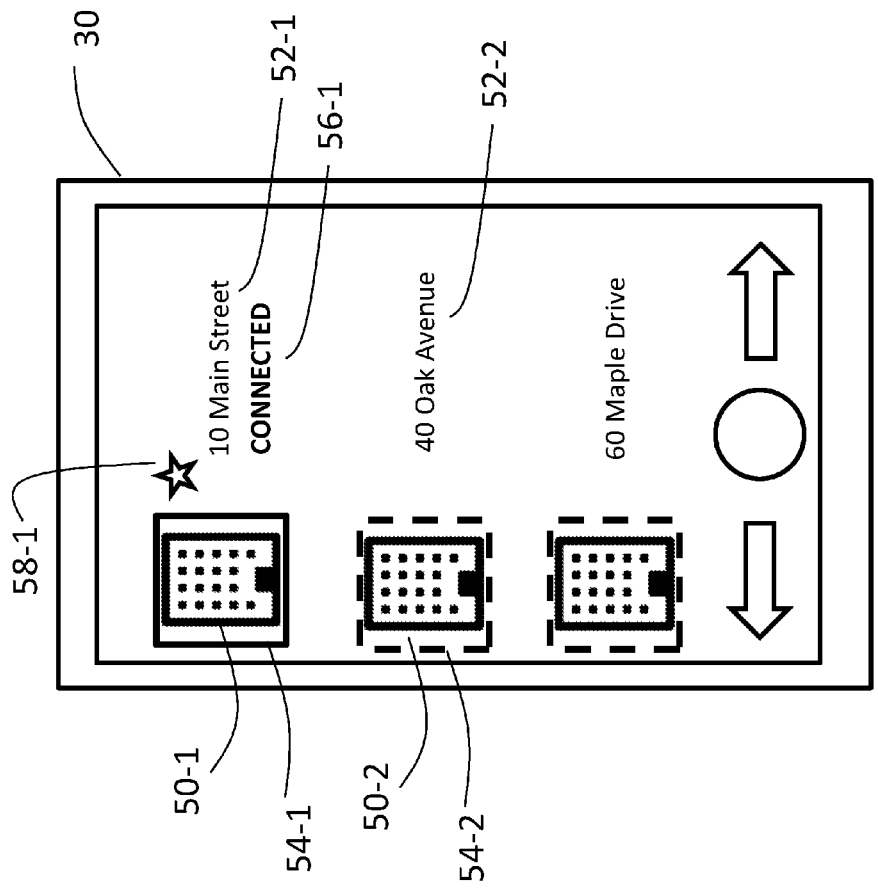
FIG. 4 depicts a user interface on a mobile device in an embodiment.

Once a connection is established between the mobile device 30 and the elevator system 10 at 210, the user interface on mobile device 30 may change to indicate the connection, as shown in FIG. 4. A connection status indicia 56-1 may appear to indicate that the mobile device 30 is now in communication with the elevator system 10 at building 50-1.

At 212, the user may select another building where connection to the elevator system 10 is desired. If the user does not select another building at 212, flow proceeds to 250 where the mobile device 30 interacts with the elevator system 10 at the building connected to at 210.

If at 212 the user wishes to connect to an elevator system 10 in another building, instead of the elevator system automatically connected to in 210, flow proceeds to 214. At 212, the user may initiate selection of another building through the user interface of FIG. 4 by selecting the building indicia 50-2 of a building having an elevator system 10 that the mobile device 30 is not currently in communication with.

Figure 5:
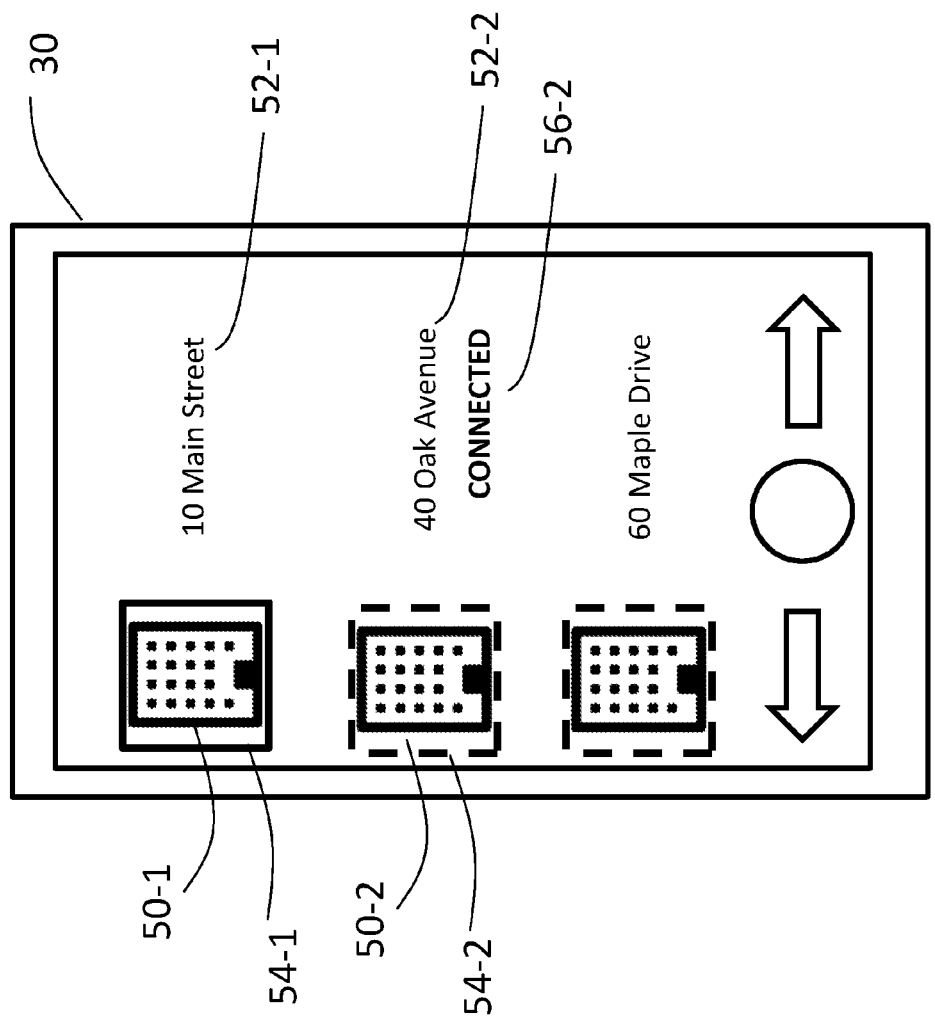
FIG. 5 depicts a user interface on a mobile device in an embodiment.

At 214, the mobile application determines if the user is registered with the other building. If so, flow proceeds to 216 where the connection established at 210 is terminated, and a new connection is established between the mobile device 30 and the elevator system 10 at the other building. The user interface may be updated as shown in FIG. 5. As shown in FIG. 5, a connection status indicia 56-2 indicates that the mobile device 30 is now in communication with the elevator system 10 at building 50-2. Flow then proceeds to 250, where the mobile device 30 interacts with the elevator system 10 connected to at 216.

If at 208 the user is not registered with any of the elevator system(s) 10 within the geographical range of the geographical location of the mobile device 30, flow proceeds to 220. Also, if at 214 the user selects another building at which the user is not registered with the elevator system 10, flow proceeds to 220. At 220, a registration process is initiated to register the user with the elevator system 10. The registration process may include the user providing information identifying the user (e.g., name, office location, badge number, phone number, etc.). The elevator system 10 may access an employee directory for the building to confirm that the user is authorized to access the building. At 222, as an optional step, an administrator (e.g., a human) may review the request for registration. Once registration is confirmed, flow proceeds to 224 where the user is provided an indication that they are now registered with the elevator system 10. At 226, the user is presented with an option to make the other building preferred. Flow then proceeds to 216 and 250, as described above.

Embodiments use a mobile device's geographical location to identify the nearest building, and surrounding buildings, compatible with a mobile application for making elevator calls. This enables a user to select a building based on geographical location of the mobile device and then select the building for registration. This mobile application also allows users to automatically connect to the nearest building to place an elevator call. The user does not need to know the building number/name to register with a building and the user does not need to select a building from a building list to place an elevator call.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable program instructions may execute entirely on the user's mobile device, partly on the user's mobile device, as a stand-alone software package, partly on the user's mobile device and partly on a remote computer or entirely on the remote computer or server. In the latter scenario, the remote computer may be connected to the user's mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method for connecting a mobile device to an elevator system, the mobile device executing a mobile application for issuing elevator calls to the elevator system, the method comprising:
   determining a geographical location of the mobile device;
   obtaining a list of buildings within a geographical range of the geographical location of the mobile device;
   determining if a registered building is in the list of buildings, the registered building being a building at which a user has registered with the elevator system; and
   automatically establishing a connection between the mobile device and the elevator system at the registered building nearest to the geographical location of the mobile device.

2. The method of claim 1, wherein:
   the determining includes determining if the list of buildings includes a preferred building, the preferred building being a registered building that the user has designated as preferred; and
   wherein the automatically establishing the connection between the mobile device and the elevator system comprises establishing the connection between the mobile device and the elevator system at the preferred building.

3. The method of claim 2, wherein:
   the automatically establishing the connection between the mobile device and the elevator system comprises establishing the connection between the mobile device and the elevator system at the preferred building nearest to the geographical location of the mobile device.

4. The method of claim 3, wherein:
   the establishing the connection between the mobile device and the elevator system at the preferred building nearest to the geographical location of the mobile device occurs when the preferred building nearest to the geographical location of the mobile device is within a first threshold distance.

5. The method of claim 4, wherein:
when the preferred building nearest to the geographical location of the mobile device is not within the first threshold distance, then establishing the connection between the mobile device and the elevator system at a registered building nearest to the geographical location of the mobile device when the registered building nearest to the geographical location of the mobile device is within a second threshold distance.

6. The method of claim 1, further comprising:
receiving a selection to establish a connection with a second elevator system at a second building;
terminating the connection between the mobile device and the elevator system at the registered building; and
establishing a second connection between the mobile device and the second elevator system at the second building.

7. The method of claim 6, wherein:
establishing the second connection between the mobile device and the second elevator system at the second building includes determining if the user is registered with the second building;
when the user is registered with the second building, establishing the second connection between the mobile device and the second elevator system at the second building;
when the user is not registered with the second building, completing a registration process with the second elevator system at the second building prior to establishing the second connection between the mobile device and the second elevator system at the second building.

8. The method of claim 7, wherein:
completing the registration process with the second elevator system at the second building prior to establishing the second connection between the mobile device and the second elevator system at the second building includes designating the second building as a preferred building.

9. A mobile device comprising:
a memory storing a mobile application;
a processor for executing the mobile application; and
a communications module for communicating with an elevator system;
wherein the processor executes the mobile application to implement operations comprising:
determining a geographical location of the mobile device;
obtaining a list of buildings within a geographical range of the geographical location of the mobile device;
determining if a registered building is in the list of buildings, the registered building being a building at which a user has registered with the elevator system; and
automatically establishing a connection between the mobile device and the elevator system at the registered building nearest to the geographical location of the mobile device.

10. The mobile device of claim 9, wherein:
the determining includes determining if the list of buildings includes a preferred building, the preferred building being a registered building that the user has designated as preferred; and
wherein the automatically establishing the connection between the mobile device and the elevator system comprises establishing the connection between the mobile device and the elevator system at the preferred building.

11. The mobile device of claim 10, wherein:
the automatically establishing the connection between the mobile device and the elevator system comprises establishing the connection between the mobile device and the elevator system at the preferred building nearest to the geographical location of the mobile device.

12. The mobile device of claim 11, wherein:
the establishing the connection between the mobile device and the elevator system at the preferred building nearest to the geographical location of the mobile device occurs when the preferred building nearest to the geographical location of the mobile device is within a first threshold distance.

13. The method of claim 12, wherein:
when the preferred building nearest to the geographical location of the mobile device is not within the first threshold distance, then establishing the connection between the mobile device and the elevator system at a registered building nearest to the geographical location of the mobile device when the registered building nearest to the geographical location of the mobile device is within a second threshold distance.

14. The mobile device of claim 9, wherein the operations further comprise:
receiving a selection to establish a connection with a second elevator system at a second building;
terminating the connection between the mobile device and the elevator system at the registered building; and
establishing a second connection between the mobile device and the second elevator system at the second building.

15. The mobile device of claim 14, wherein:
establishing the second connection between the mobile device and the second elevator system at the second building includes determining if the user is registered with the second building;
when the user is registered with the second building, establishing the second connection between the mobile device and the second elevator system at the second building;
when the user is not registered with the second building, completing a registration process with the second elevator system at the second building prior to establishing the second connection between the mobile device and the second elevator system at the second building.

16. The mobile device of claim 15, wherein:
completing the registration process with the second elevator system at the second building prior to establishing the second connection between the mobile device and the second elevator system at the second building includes designating the second building as a preferred building.

17. A computer program product for connecting a mobile device and an elevator system, the computer program product comprising a non-transitory computer readable storage medium having program instructions embodied therewith, the program instructions executable by a processor to cause the processor to implement operations comprising:
determining a geographical location of the mobile device;
obtaining a list of buildings within a geographical range of the geographical location of the mobile device;

determining if a registered building is in the list of buildings, the registered building being a building at which a user has registered with the elevator system; and automatically establishing a connection between the mobile device and the elevator system at the registered building nearest to the geographical location of the mobile device.

\* \* \* \* \*